United States Patent [19]
Sasaki et al.

[11] Patent Number: 5,920,541
[45] Date of Patent: Jul. 6, 1999

[54] DATA DISC HAVING BOTH DATA AND DATA RETRIEVAL INFORMATION STORED THEREON AND METHOD FOR RETRIEVING DATA RECORDED ON THE DATA DISC

[75] Inventors: Norimasa Sasaki, Saitama; Koji Takagi, Kanagawa, both of Japan

[73] Assignee: Sony Corporation, Tokyo, Japan

[21] Appl. No.: 08/458,012

[22] Filed: Jun. 1, 1995

Related U.S. Application Data

[63] Continuation of application No. 08/111,829, Aug. 25, 1993, abandoned, which is a continuation of application No. 07/640,105, Jan. 11, 1991, abandoned.

[30] Foreign Application Priority Data

Jan. 12, 1990 [JP] Japan ..................................... 2-005325

[51] Int. Cl.$^6$ ....................................................... G11B 7/00
[52] U.S. Cl. ........................................... 369/275.3; 369/32
[58] Field of Search ................................... 364/419, 401, 364/47, 32; 369/33, 32, 34, 58, 59, 30, 275.3; 395/400, 425, 600

[56] References Cited

U.S. PATENT DOCUMENTS

| | | | |
|---|---|---|---|
| 3,757,037 | 9/1973 | Bialek | 364/900 |
| 4,486,870 | 12/1984 | Pettigrew et al. | 369/32 |
| 4,490,810 | 12/1984 | Hon | 364/900 |
| 4,636,977 | 1/1987 | Ikemoto et al. | 364/419 |
| 4,733,386 | 3/1988 | Shimoi | 369/59 |
| 4,737,912 | 4/1988 | Ichikawa | 364/413 |
| 4,760,526 | 7/1988 | Takeda et al. | 364/300 |
| 4,779,080 | 10/1988 | Coughlin et al. | 364/900 |
| 4,912,671 | 3/1990 | Ishida | 364/419 |
| 4,934,823 | 6/1990 | Okami | 395/400 |
| 4,953,122 | 8/1990 | Williams | 395/425 |
| 5,014,192 | 5/1991 | Mansfield et al. | 395/425 |
| 5,165,043 | 11/1992 | Miyahara et al. | 235/380 |
| 5,204,959 | 4/1993 | Sakuragi | 395/600 |
| 5,315,570 | 5/1994 | Miura et al. | 369/48 |
| 5,325,483 | 6/1994 | Ise et al. | 395/162 |
| 5,359,580 | 10/1994 | Miura et al. | 369/47 |

OTHER PUBLICATIONS

Proceedings of SPIE—The International Society For Optical Engineering, vol. 899, Optical Storage Technology and Applications, Jan. 15, 1988, Los Angeles, CA, USA, pp. 254–251; L.S. Rann: "CD–ROM and Knowledge Integration."

Journal of Imaging Technology, vol. 12, No. 5, Oct. 1986, Springfield, USA, pp. 288–192; Thomas et al.: "Interfacing Optical Disk to a Document Image Storage and Retrieval System."

Proceedings of Optica '87 The International Meeting for Optical Publishing and Storage, Apr. 17, 1987, Amsterdam, Netherlands, pp. 331–338; Russo et al.: "Optical Storage for Archiving Astronomical Data."

*Primary Examiner*—Nabil Hindi
*Attorney, Agent, or Firm*—Limbach & Limbach L.L.P.

[57] ABSTRACT

There is disclosed a data disc on which are recorded at least main text data on which letter or character data are recorded, index data for retrieving the main text data, names of retrievable items, and leading addresses of the indices associated with the names of the retrievable items to enable unification of the retrieving software pieces. There is also disclosed a data retrieving method including displaying the names of retrieving items on the data disc, entering data of retrieving items in dependence upon the displayed names of the retrieving items, retrieving the entered data of the retrieving items on the basis of the index and reading out and displaying the main text data associated with the data of the retrieved items to enable the retrieving software pieces to be unified as well as to enable a variety of application software pieces to be realized.

6 Claims, 19 Drawing Sheets

BASIC STRUCTURE OF UPPER LEVEL INDEX

FIG. 9(a)

| KEY LENGTH | ENTRY KEY (ROW OF LETTERS OR CHARACTERS) | ADDRESS DATA |
|---|---|---|

BASIC STRUCTURE OF LOWERMOST LEVEL INDEX

FIG. 9(b)

| KEY LENGTH | ENTRY KEY (ROW OF LETTERS OR CHARACTERS) | ADDRESS DATA TO MAIN TEXT | ADDRESS DATA TO HEADINGS |
|---|---|---|---|

COMPLEX RETRIEVAL

| BASIC ENTRY | GROUP ENTRY | | | | |
|---|---|---|---|---|---|
|  | KEY ITEM | MEMBER ITEM | MEMBER ITEM | ... | MEMBER ITEM |

FIG. 15(a)

BASIC ENTRY

| 00H | KEY LENGTH | ENTRY KEY | MAIN TEXT ADDRESS | TITLE ADDRESS |
|---|---|---|---|---|

FIG. 15(b)

GROUP ENTRY KEY ITEM

| 80H | KEY LENGTH | NUMBER OF MEMBER | ENTRY KEY |
|---|---|---|---|

FIG. 15(c)

MEMBER ITEM

| C0H | MAIN TEXT ADDRESS | TITLE ADDRESS |
|---|---|---|

FIG. 15(d)

WORD RETRIEVAL

| LEADING WORD COINCIDENCE | 1 BYTE | 1 BYTE | KEY LENGTH | 6 BYTES | 6 BYTES |
|---|---|---|---|---|---|
| BASIC ENTRY | 00H | KEY LENGTH | ENTRY KEY | MAIN TEXT ADDRESS | TITLE ADDRESS |

FIG. 10

| BASIC ENTRY | 00H | KEY LENGTH | ENTRY KEY | MAIN TEXT ADDRESS | TITLE ADDRESS |
|---|---|---|---|---|---|

FIG. 11(a)

| GROUP ENTRY KEY ITEM | 80H | KEY LENGTH | NUMBER OF MEMBER | ENTRY KEY | TITLE ADDRESS |
|---|---|---|---|---|---|

FIG. 11(b)

| MEMBER ITEM | C0H | MAIN TEXT ADDRESS |
|---|---|---|

FIG. 11(c)

| MENU RETRIEVAL MENU DATA | 1F43 | STRING OF LETTER OR CHARACTERS | 1F63 | MAIN TEXT ADDRESS |
|---|---|---|---|---|

FIG. 12

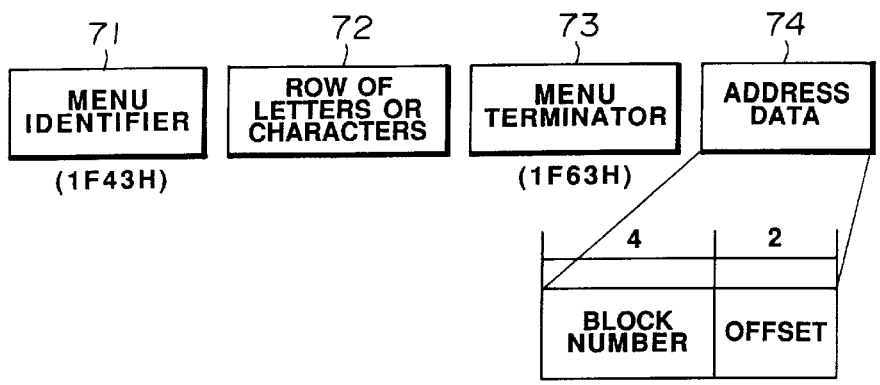

- BLOCK NUMBER:IN-FILE BLOCK NUMBER (BCD 8 DIGITS)
- OFFSET VALUE:IN-BLOCK POSITION (BCD 4 DIGITS)

FIG.14(a)

71 INTERNAL DATA 73

| MENU IDENTIFIER | JAPANESE DISHES | MENU TERMINATOR | ADDRESS DATA | LINE CHANGE |
| MENU IDENTIFIER | EUROPEAN DISHES | MENU TERMINATOR | ADDRESS DATA | LINE CHANGE |
| MENU IDENTIFIER | CHINESE DISHES | MENU TERMINATOR | ADDRESS DATA | LINE CHANGE |
| MENU IDENTIFIER | TEA OR COFFEE · LUNCHEON | MENU TERMINATOR | ADDRESS DATA |
| LINE CHANGE MENU IDENTIFIER | JAPANESE DISHES | MENU TERMINATOR | ADDRESS DATA |
| LINE CHANGE |

FIG.14(b)

DISPLAY DATA

```
JAPANESE DISHES
EUROPEAN DISHES
CHINESE DISHES
TEA, COFFEE, LUNCHEON
WINE OR LIQUOR
```

FIG.14(c)

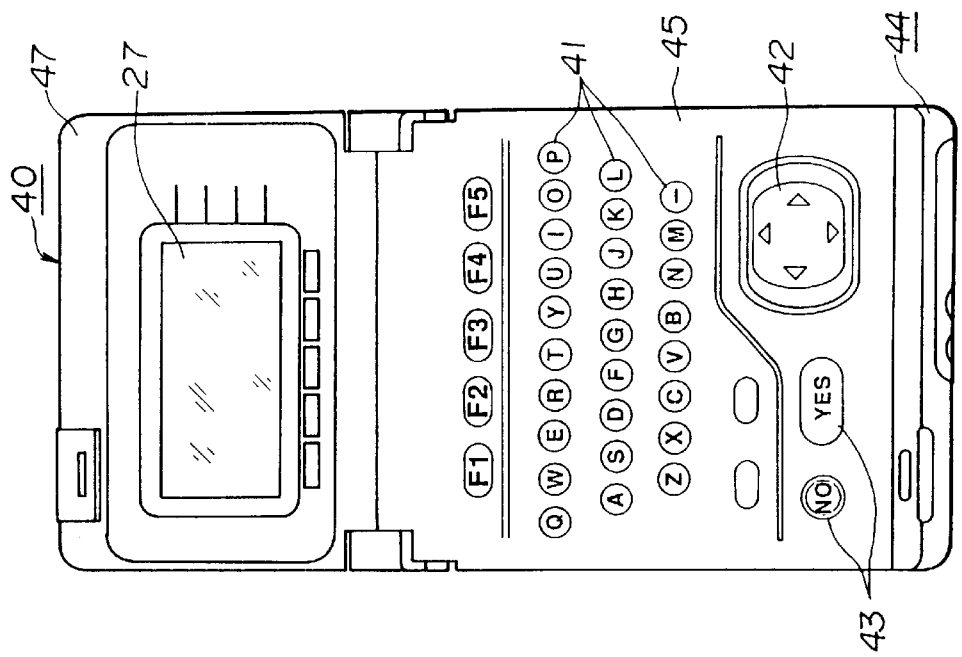
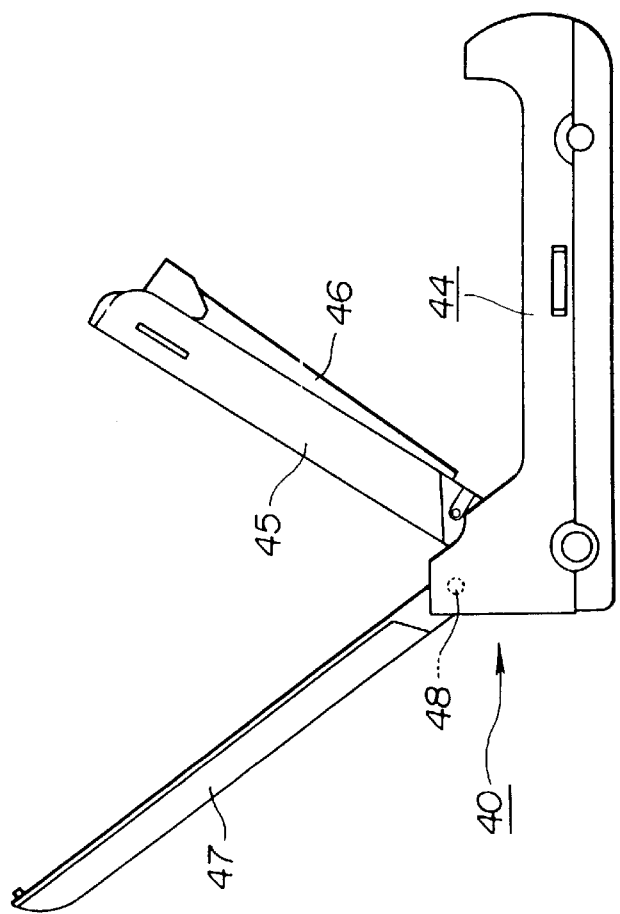
FIG. 19
FIG. 18

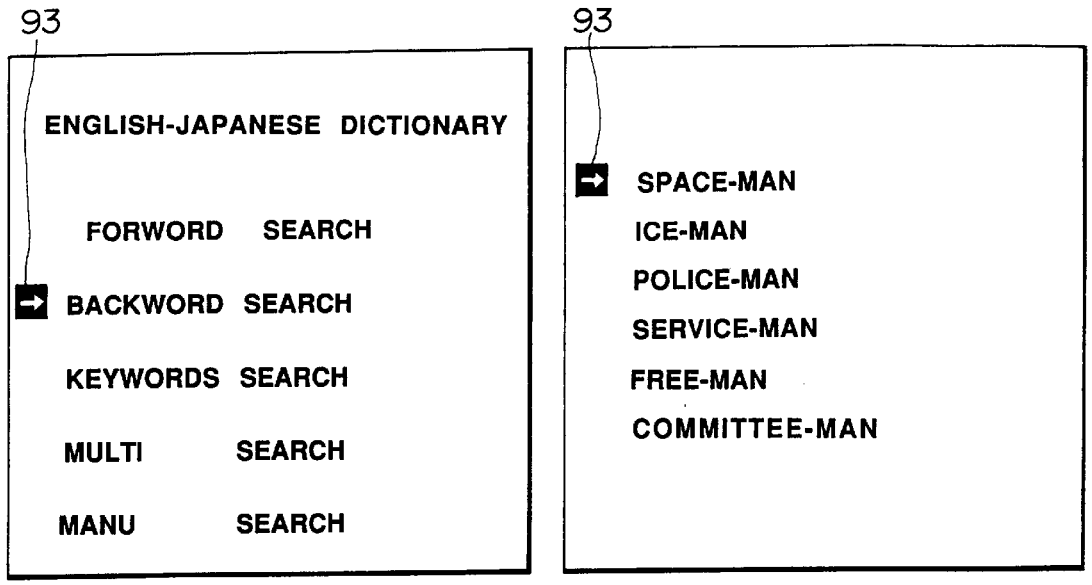
FIG.22(a)
FIG.22(c)
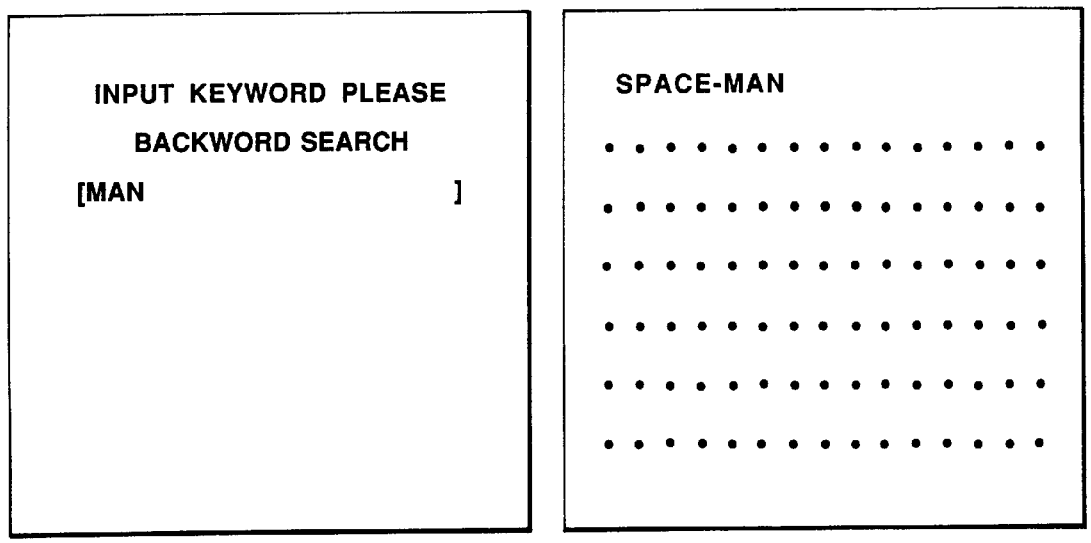
FIG.22(b)
FIG.22(d)

FIG. 23(a)

THIS DISC IS GUIDE
TO RESTAURANTS

FIG. 23(b)

GUIDE TO
RESTAURANTS

93 → FORWORD SEARCH
→ MULTI     SEARCH

FIG. 23(c)

GUIDE TO
RESTAURANTS
NAME OF RESTAURANT ?
[                              ]
TYPE OF FOOD ?
[                              ]
LOCATION OF RESTAURANT ?
[                              ]
PRICE RANGE
[                              ]

LOCATION OF RESTAURANT ?

93 → MANHATTAN

LONG ISLAND

93 → NIPPON SUSHI

MANHATTAN SUSHI

ICHIBAN SUSHI

LONG ISLAND SUSHI

NIPPON SUSHI

PHONE . . . - . . .

.PRICE RANCE    2000YEN~
.CAPACITY    100 PERSONS

DATA DISC HAVING BOTH DATA AND DATA RETRIEVAL INFORMATION STORED THEREON AND METHOD FOR RETRIEVING DATA RECORDED ON THE DATA DISC

This is a continuation of application Ser. No. 08/111,829 filed on Aug. 25, 1993, of NORIMASA SASAKI ET AL. for DATA DISC HAVING BOTH DATA AND DATA RETRIEVAL INFORMATION STORED THEREON AND METHOD FOR RETRIEVING DATA RECORDED ON THE DATA DISC, now abandoned, which is a continuation of prior application Ser. No. 07/640,105, of the same inventor and title, filed Jan. 11, 1991, and now abandoned.

BACKGROUND OF THE INVENTION

1. Field of the Invention

This invention relates to a data disc on which text data such as a dictionary or an encyclopedia are recorded, and a method for retrieving text data recorded on the data disc by retrieving retrieval item data on the basis of index data recorded on the data disc and retrieving the text data associated with the retrieval item data.

2. Description of the Prior Art

A so-called CD-ROM disc, which is an optical disc on which data, such as dictionary or encyclopedia data, are recorded for semi-permanent storage, and a reproducing apparatus for reproducing data recorded on the disc, are currently in use.

The CD-ROM disc means a disc in which the so-called compact disc (CD) standard as one of the digital audio disc standards is expanded and in which the data of the recording format such as that shown in FIGS. 1(a) to 1(c) are recorded in place of the CD audio data. When recording data on the disc is in accordance with the data recording format, data of a predetermined unit are grouped into one block, and data readout is performed with the block as a unit. The length of one block is set to $1/75$ second which is the same as the block length of a subcode of the audio CD, such that there are 75 blocks in one second. Block retrieval is performed using an absolute address of the subcode as in the case of the music CD. The total volume of data that may be recorded in each block is 2352 bytes.

The mode 0 format, shown in FIG. 1(a), is used in the lead-in or lead-out or as a demarcation of recording areas, and is constituted by a 12-byte sync signal 201, of a 4-byte header 202 and a data area 203 composed of 2336 bytes, in all of which are entered "0."

The header 202 is composed of a block address 202a, minute-unit time data of the block 202b, second-unit time data of the block 202c, a block number 202d of the block, and a mode data 202e.

The block shown in FIG. 1(b) is a block for recording data in need of operational reliability, such as character or letter data or computer data, and is constituted by sync signal 201, header 202, a 2048-byte user data area for recording desired data, error detection code (EDC), an all "0" space area 207 and a 276-byte error correction code area (ECC) 208. The ECC 208 is constituted by a 172-byte P parity 208a and a 104-byte Q parity 208b.

A block shown in FIG. 1(c) is a block used for recording data that may be corrected by interpolation even when in error, and is composed of sync signal area 201, header area 202 and 2336-byte user data area 210. User data may be entered in header 202 et seq. of this block which is not provided with a supplemental error correction code.

For retrieving the data recorded in accordance with the above described CD-ROM format, it is necessary that the logical format for record data be prescribed and the standard of the International Standards Organization (ISO) 9660 has been known as one of such logical standards.

The ISO 9660 standard prescribes the logical format shown in FIG. 2. In a predetermined absolute address on the CD-ROM disc, that is, in a 2 second 16 sector position, a volume description 211 is recorded. In this volume descriptor 211, there are recorded the manner in which the disc is logically organized, route directory position data for a standard file system structure, recording on copyright data, the file name and publishing company.

In the route directory 212 stored in the address indicated by the route directory position data, there are recorded, for example, the positions and lengths of the files 213 recorded in the data disc.

These files 213 are a plurality of literatures or publications recorded on the data disc, such as Japanese language dictionary, English-Japanese dictionary, Japanese-English dictionary or the Chinese-Japanese dictionary.

The recording format of a file 213 is the last that is prescribed in the ISO 9660 world standard. Thus, it is up to the data disc publisher to record main text data downstream of the file 213 in an optional format and to develop by its own efforts the method of retrieving the main text data recorded by this optional format.

The method for retrieving the main text data is written into, for example, a floppy disc or an IC card, and is formulated as the data retrieving software.

It is up to the user to purchase the data-retrieving software with the data disc and to operate the reproducing equipment in accordance with the retrieving method uniquely developed by the data disc publisher to retrieve the desired data.

With the above described ISO 9660 world standard, the recording format for file 213 is the last that is prescribed, and main text data, for example, downstream of the file 213, has to be recorded by a desired format by each data disc publisher and the method for retrieving the main text data recorded by such optional format is uniquely developed by the publisher. The result is that the data retrieving method differs from one data disc publisher to another so that production costs become prohibitive due to increased time and expenses for developing the retrieving methods.

Since the retrieving method differs from one data disc to another, the user is obliged to learn the retrieving method for each data disc and to purchase the retrieving software for each data disc at considerable expense. This is not desirable for versatility of the data discs and reproducing equipment for the data disc.

Besides, since the retrieving software needs to be written in other media, such as floppy discs or IC cards, driving systems for the data disc and the retrieving software become necessary with the result that the reproducing equipment becomes bulky in size to render it difficult to cope with the recent tendency towards smaller sized equipment.

Although there is known a retrieving method for retrieving plural data discs for dictionary type data by a sole type of the retrieving software, this retrieving method also is not practically useful since the discs are limited to those for dictionary type data.

OBJECT AND SUMMARY OF THE INVENTION

It is, therefore, an object of the present invention to provide a data disc and a data retrieving method according to which the recording format of recording data on the data disc and the method for retrieving the software adapted for retrieving the data disc can be unified.

With the data disc of the present invention, at least the main text data, including letter or character data, index data for retrieving the main text data, names of retrievable items and the leading address of the index data associated with the names of the retrievable items, are recorded on the disc.

The data retrieving method according to the present invention includes using a data disc on which at least the main text data including letter or character data, index data for retrieving the main text data, names of the retrievable items and leading addresses of the index data associated with the names of the retrievable items, are recorded, displaying the names of the retrievable items, entering the data of retrieval items associated with the displayed names of the retrievable items, retrieving the entered data of the retrievable items on the basis of the index data and reading out and displaying the main text data associated with the data of the retrieval items.

With the data disc of the present invention, at least the main text data, including letter or character data, index data for retrieving the main text data, names of the retrievable items and the leading addresses of the index data associated with the names of the retrievable items, are all recorded on the same disc, so that it becomes possible to unify the retrieval software adapted for retrieving such data on the disc.

On the other hand, composite retrieval may be achieved with the data retrieval method of the present invention comprising, using the above mentioned data disc, displaying the names of the retrieving items, entering data of retrieving items in accordance with the displayed retrieval items, retrieving the entered search item data on the basis of the index, reading out the main text data associated with the search item data, and displaying the read-out data.

BRIEF DESCRIPTION OF THE DRAWINGS

FIGS. 9(a) and 9(b) are diagrammatic views showing the format of the basic structure of the upper order level index and the lower order level index, respectively.

FIG. 10 is a diagrammatic view showing the format of a basic entry for word searching.

FIGS. 11(a), 11(b) and 11(c) are diagrammatic views showing the basic entry, group entry key items and a member item for condition retrieval, respectively.

FIG. 12 is a diagrammatic view showing the menu data format for menu retrieval.

FIGS. 14(a), 14(b) and 14(c) are diagrammatic views showing the structure of an input auxiliary table.

FIGS. 15(a) to 15(d) are a diagrammatic view showing the format of the basic entry, group entry key item and member items.

FIG. 18 is a vertical side view and FIG. 19 is a top view, with the cover open of the overall appearance of the disc reproducing apparatus.

FIGS. 22(a)–22(d) are diagrammatic views showing an example of a display sequence for a word search (end word search).

FIGS. 23(a)–23(i) are diagrammatic views showing an example of a display sequence for compound retrieval.

DETAILED DESCRIPTION OF THE PREFERRED EMBODIMENTS

Figure 1A:
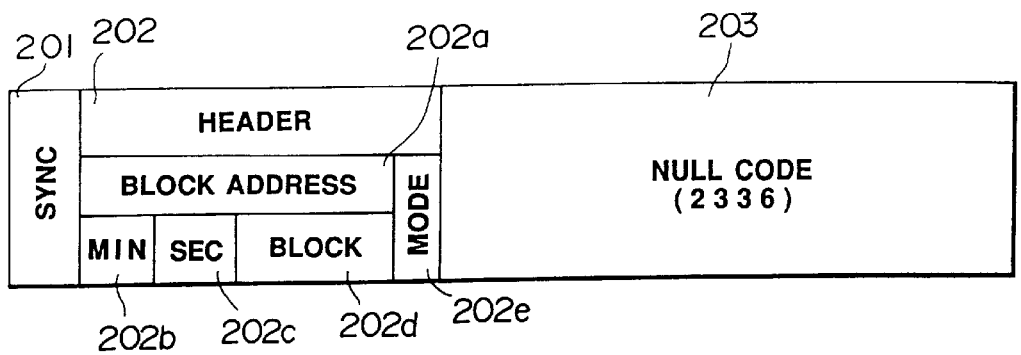
FIGS. 1(a)–1(c) are a diagrammatic view showing the physical recording format of the CD-ROM.
Figure 1B:
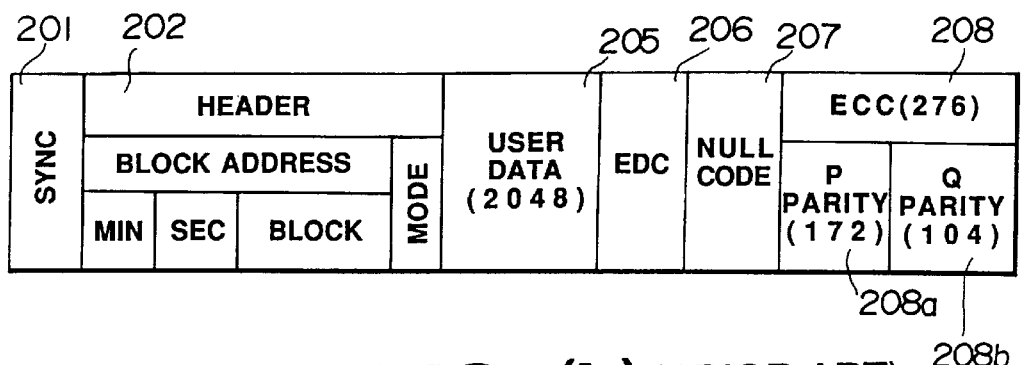
Figure 1C:
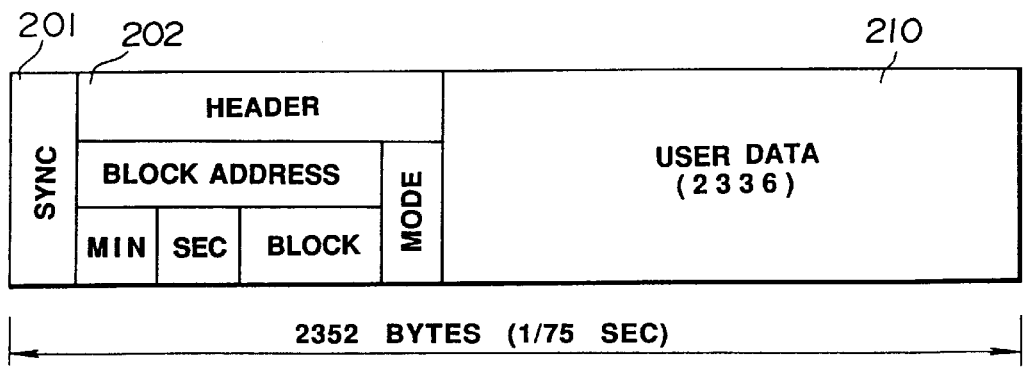

By referring to the drawings, illustrative embodiments of the data disc and the data retrieving method according to the present invention will be explained in detail.

Figure 2:
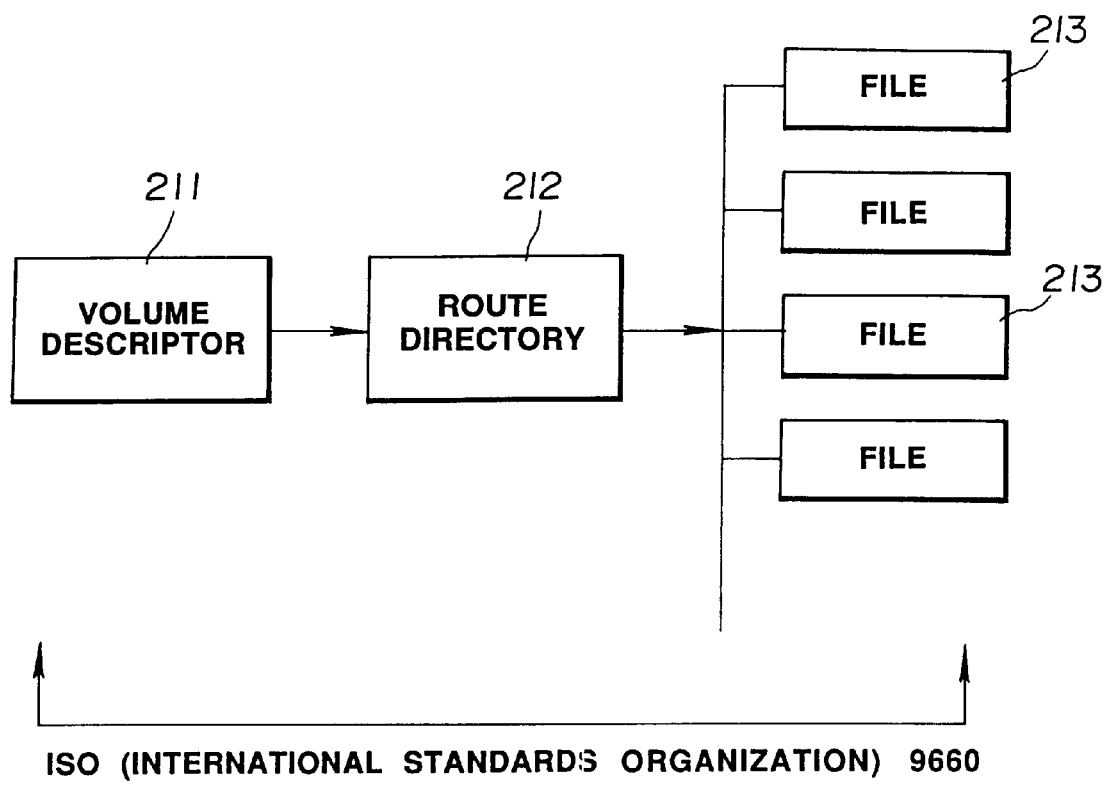
FIG. 2 is a diagrammatic view for illustrating the format prescribed in ISO 9660.
Figure 3:
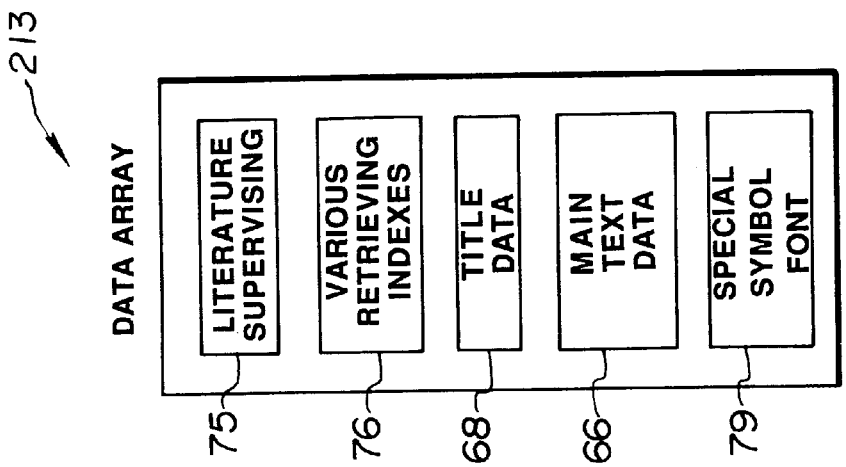
FIG. 3 is a diagrammatic view showing the organization of data recorded in a file.

FIGS. 2 and 3 illustrate a logical format for a data disc according to the present invention.

FIG. 2 illustrates a logical format prescribed in the above mentioned ISO 9960 world standard. The volume descriptor 211, the route directory 212 and various files 213 are prescribed therein, as mentioned previously.

Each file 213 constitutes the main body of the dictionary and is mainly composed of letter or character data. For performing various reproducing and retrieving methods efficiently, it is constituted by data shown in FIG. 3, as in the cases of books, such as dictionaries.

The data retrieving methods according to the present invention may be grouped into i) word retrieval (forward coincidence);
ii) word retrieval (rear coincidence);
iii) conditional retrieval (free key-word retrieval);
iv) menu retrieval; and
v) complex or composite retrieval;

whereby the design details of the retrieval method have been established to provide methods with versatility and maintain interchangeability of various application software pieces.

For word retrieval, words or phrases to be searched have been put into order in the headings. The forward coincidence method is used to retrieve the beginning part of a word or phrase to be searched when the beginning part is known to the user, while the rear coincidence method is used to entering and retrieve the latter part of a word or phrase to be searched when the latter part is known to the user.

The conditional retrieval method is used when research is desired to be made from the contents of the main text instead of from the dictionary or from the heading words. With the conditional retrieval, an AND logic retrieval may be made under designation of plural key words. Up to 5 key words can be designated in the AND logic statement.

The menu retrieval is used when the words or phrases are to be found out in a field of interest. It is a retrieving method whereby, in the case of the data which have been put in order as to the genre by a table of contents, the desired main text is found out by checking the table of contents.

The composite retrieval is a retrieving method in which if there exist a plurality of retrieving items, condition setting is made for each of these retrieving items before proceeding to an AND logic statement retrieval. Up to four retrieving items, for example, may be set in each composite retrieval, while up to five different kinds of composite retrieval for example, may be made in one literature.

In FIG. 3, each file 213 includes, for example, a literature supervising block 75, various retrieving indices 76, title data 68, main text data 66 and font pattern data 79.

The literature supervising block 75 is located at the leading end of the file 213 and indicates the above mentioned main text data 66 recorded in the file 213 and the addresses of the locations in which the various retrieving indices 76 are recorded. The block 75 is constructed as shown for example in FIG. 4.

In this figure, the literature supervising block 75 is constituted by the number of the entries 80, the document type 81, the protection data 82 and an identifier or discriminator 83.

The number of the entries 80 indicates the total number of entries, that is, the total number of discriminators 83 recorded in the literature supervising block.

The document type 81 indicates the type of the document recorded in the file. As the document type, "00H" for Japanese language dictionaries, "10H" for Chinese-Japanese dictionaries, "30H" for English-Japanese dictionaries, "40H" for dictionaries for up-to-data terminology, "60H" for books in general, "70H" for Dictionary for Synonymous Words and "80H to FFH" as the reserve for indicating books which will be published in the future, are entered as the document type codes.

The protective data 82 are data recorded by 8 bits or 1 byte for protecting a work in need of data confidentiality. For example, "000001XX" "000000XX" "00000X1X", "00000X0X", "00000XX1" and "00000XX0", are recorded as "citation inhibit", "citation permit", "print inhibit", "print permit", "display inhibit" and "display permit", respectively. The "X" is "0" or "1", "print inhibit" means inhibiting making a hard copy of the screen and "citation inhibit" means inhibiting duplication into documents.

The discriminator 83 is the data for discriminating other data such as document data, hierarchical data or special symbol data (letters or characters not prescribed in standards). Each discriminator 83 is associated with a leading block number 84, the number of blocks 85 and the version or edition.

The leading block number 84 is the relative block number in which the literature supervising block which is recorded at the leading end of the file 213 as later described is "1" and the subsequent literature supervising blocks are recorded in the order of "2", "3", "4", . . . .

The block number 85 is the data indicating over which number of blocks as counted from the literature supervising block the data indicated by the discriminator 83 is recorded.

Figure 4:
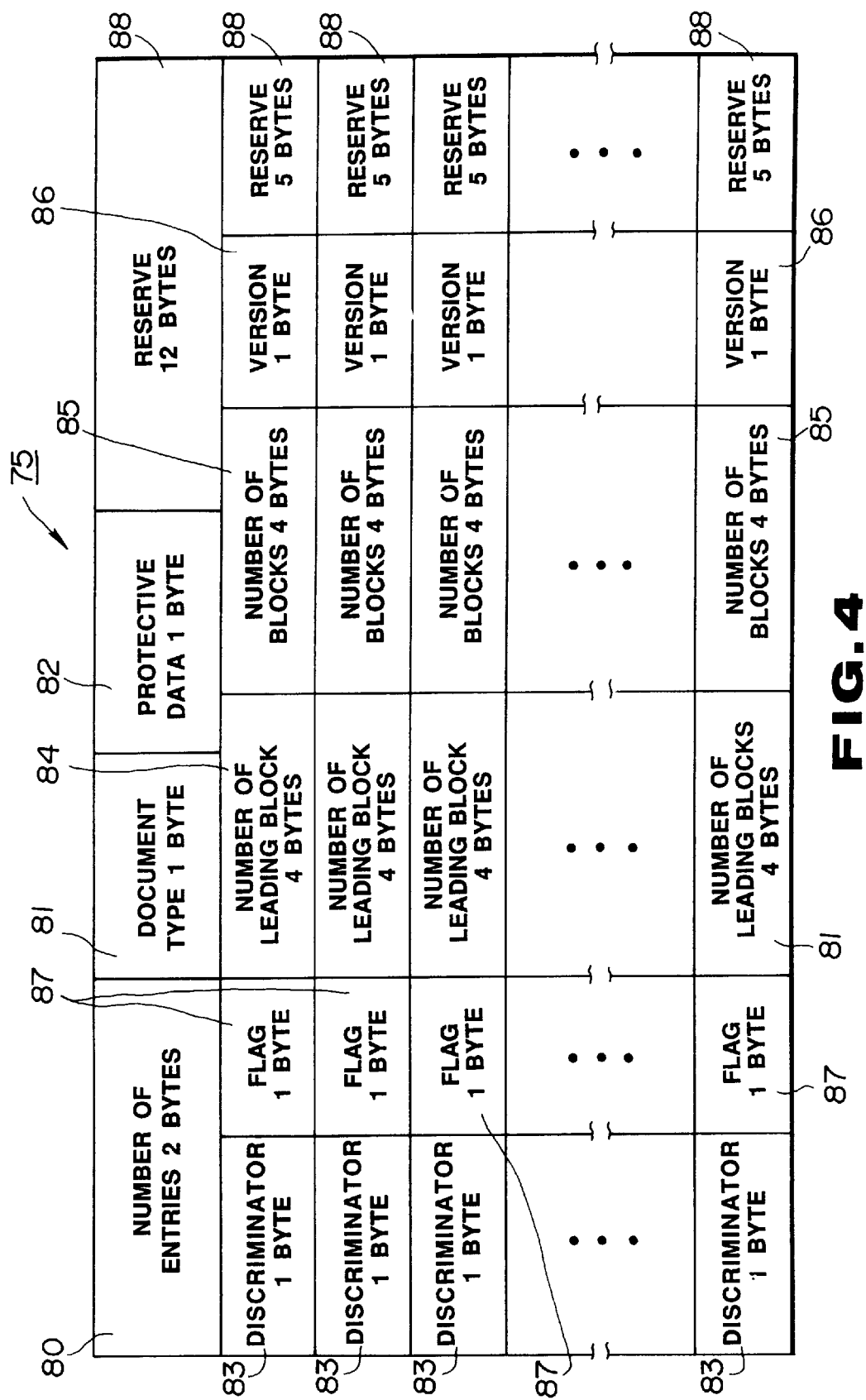
FIG. 4 is a diagrammatic view showing the construction of a literature supervising block.

The edition number indicates the number of the edition of the data structure of the recorded data. In FIG. 4, the flag 87 is not referred to in the data disc of the present embodiment. The reserve 88 is left in a blank state for data which will be added in the future.

The discriminator 83 is classified into the following codes.

As the document data, the main text data are recorded as "00H", the menu item associated with the book, table of contents and index, menu sub-items and menu data indicating the addresses of the main text data corresponding to the menu sub-data are recorded as "01H" and the copyright display data are recorded as "02H". The main text data indicated by the discriminator "00H" is necessarily recorded in the literature file 213 and, as regards the menu data indicated by "01H", the discriminator indicating only the leading menu of each menu item is recorded. As regards the document data, heading data of the condition retrieval (letter or character data for display), heading data for foremost word search of the word retrieval, heading data for end word search of the word search and heading data of menu retrieval are "03H", "04H", "06H" and "0DH", respectively. The heading data of the menu retrieval recorded by "0DH" is recorded only in a viewing point supervising block, as later described, while the discriminators "08H" to "0CH" are reserves.

As regards the discriminator of each index, the reference-inhibited retrieval index, the end word search index of the word search, the condition retrieving index, the foremost word search of the word search and the menu retrieval index, are recorded as "30H", "70H", "80H", "90H" and "A1H", respectively. The menu retrieving index is recorded only in the viewing point supervising block (to be later described).

The special symbol font pattern data 79 (FIG. 3) is actually recorded in the literature supervising block 75. As regards the discriminator, the 16-dot full-size special symbol font pattern data, the 16-dot half-size special symbol font pattern data, the 24-dot full size special symbol font pattern data, the 24-dot half-size special symbol font pattern data, the 30-dot full-size special symbol font pattern data, the 30-dot half-size special symbol font pattern data, the 48-dot full-size special symbol font pattern data and the 48-dot half-size special symbol font pattern data, are coded "F1H", "F2H", "F3H", "F4H", "F5H", "F6H", "F7H" and "F8H", respectively.

Besides these codes, the discriminator "FFH" is the code indicating the viewing point supervising block.

The disc reproducing apparatus as later described looks to this discriminator 83 to select the specified data to reproduce data indicated by the leading block number 84 and the number of blocks 85.

As various indices 76 shown in FIG. 3, there are entered word search index used for retrieving the meaning of a word, a condition retrieving index in which a plurality of, for example, five, key words associated with a retrieve-word (word to be retrieved) are entered and a word containing the key word is retrieved, a menu search index in which an item desired to be retrieved is selected from a set of menus (table of contents of a book) displayed on a display screen and a composite retrieving index in which a key word is entered in accordance with preset conditions for retrieving the relevant item. The word retrieving index is classed into a foremost word search for the case in which only the leading portion of a word to be retrieved is recognized and an end word search for the case in which only the end portion of a word to be retrieved is recognized.

The title data 68 is the letter or character data for displaying the heading of an ultimately retrieved word, and possessed by the search index 76.

The main text data 66 are the data including the meaning or results of retrieved words and are displayed ultimately as indicating the search results.

Figure 5:
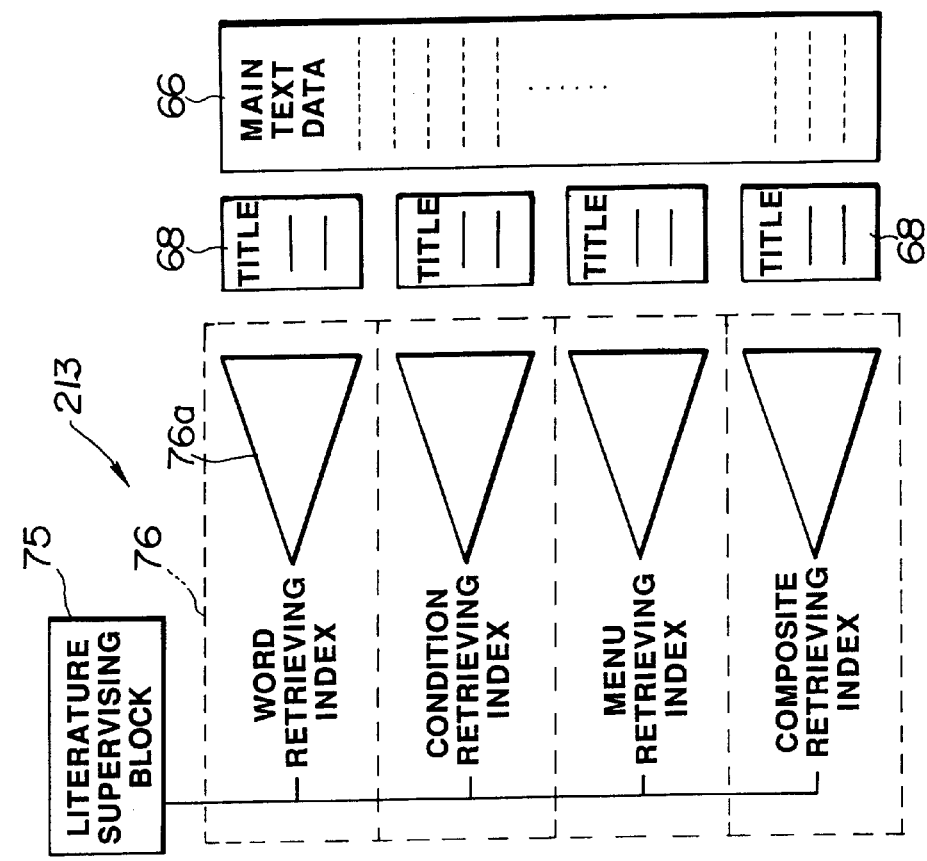
FIG. 5 is a diagrammatic view for illustrating a file structure of an embodiment of a data disc according to the present invention.

The file 213, constituted by the data 75, 76, 68, 66 and 79, has a structure as shown in FIG. 5.

The structure shown in FIG. 5 is known as a tree structure. The disc reproducing apparatus reads the literature supervising block 75, jumps to an index of the retrieving method specified by the discriminator 83, retrieves data 66 by the hierarchical index 76a, which will be explained, reads the heading of the retrieved word from the title 68 for display and reads the meaning of the retrieved word from the main text data for display.

Figure 6:
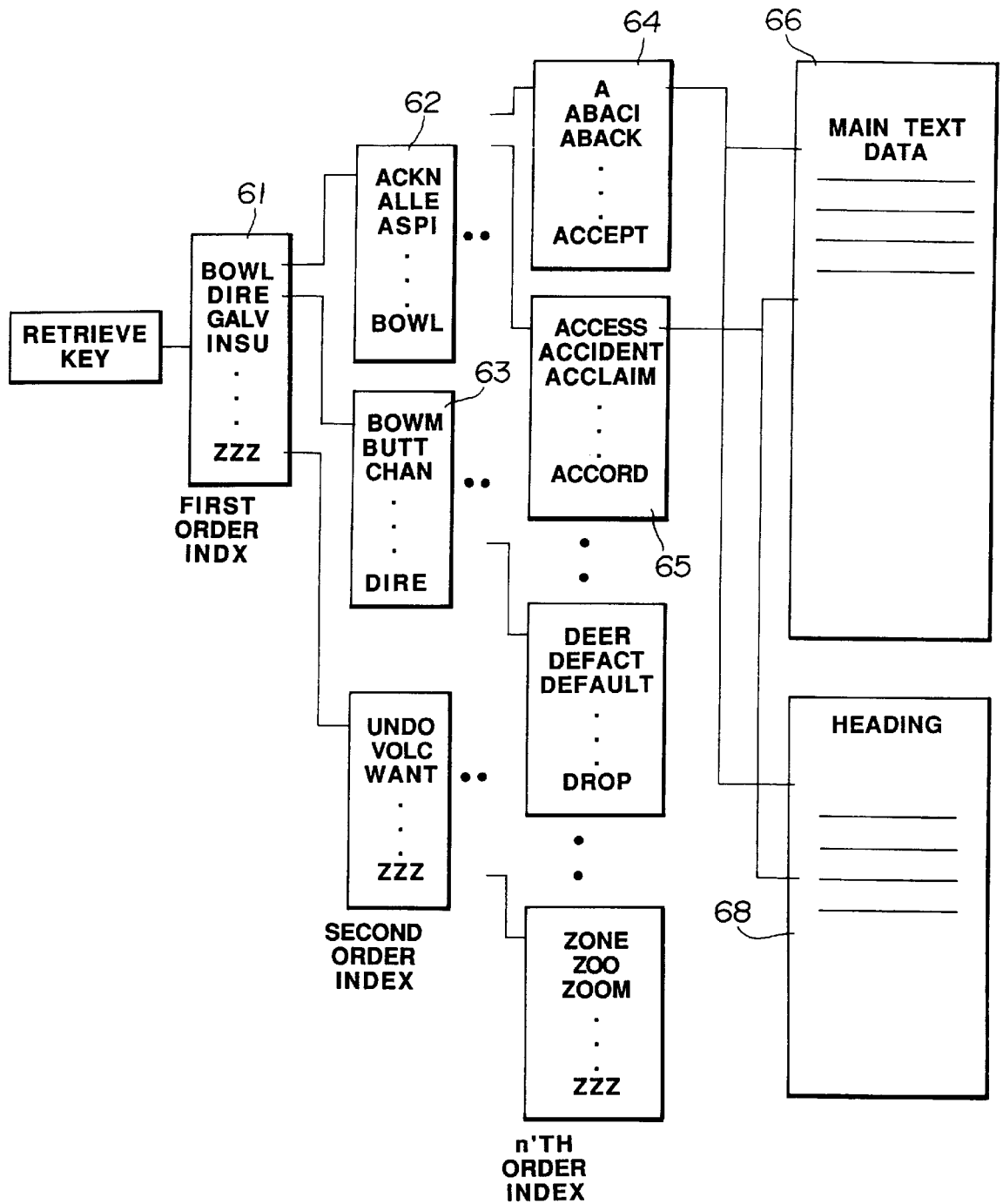
FIG. 6 is a diagrammatic view showing the structure of a hierarchical index.

FIG. 6 shows the structure of the hierarchical index 76.

In this figure, the hierarchical index 76a is constituted by a plurality of index blocks ranging from an uppermost or first order index to a lowermost or n'th order index. The index 76a has a so-called tree structure having a first order index block 61 for the first order index, a plurality of second order index blocks 62, 63, . . . for the second order index and a plurality of n'th order index blocks 64, 65, . . . for the n'th order index. The entry key of the upper level block is possessed by the next level block as the largest key in which the physical address as later described is largest in a block. That is, an entry key "BOWL" of the first order index block 61 is possessed as the largest key in the second order index block 62 which is the next index block associated with the entry key of "BOWL", whereas an entry key "DIRE" of the first order index block 61 is possessed as the largest key in the second order index 63 which is the next block associated with the entry key "DIRE".

In this manner, even if there exist voluminous data, a search may be made of the sequence of increasing numbers of orders from the first order index to the n'th order index for promptly retrieving and displaying the title and the meaning of the specified retrieval words.

Figure 7:
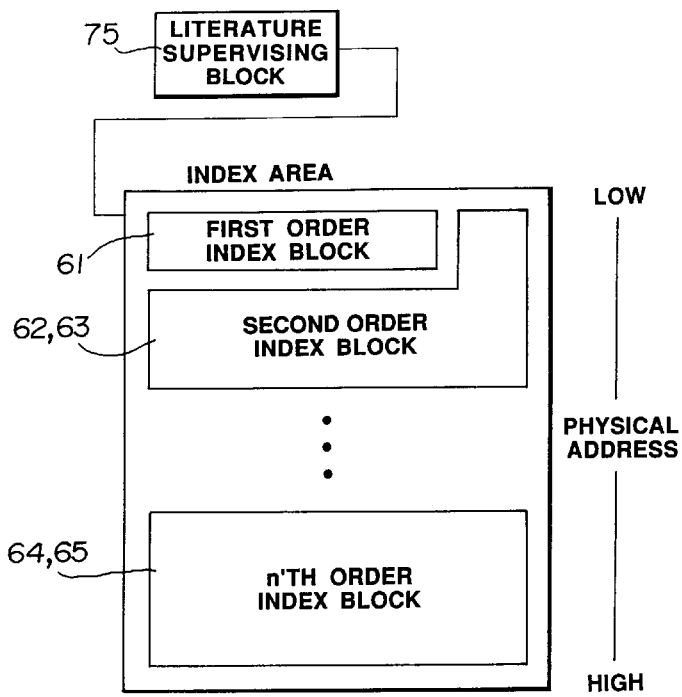
FIG. 7 is a diagrammatic view for illustrating the physical structure of the hierarchical index.

Referring to FIG. 7, the index blocks 61, 62, 63, are recorded next to the literature supervising blocks 75 from the first order index block of the lower physical address towards the n'th order index block of the higher physical address. In this manner, the same level index blocks are recorded collectively without mixing with index blocks of a different level.

Figure 8:
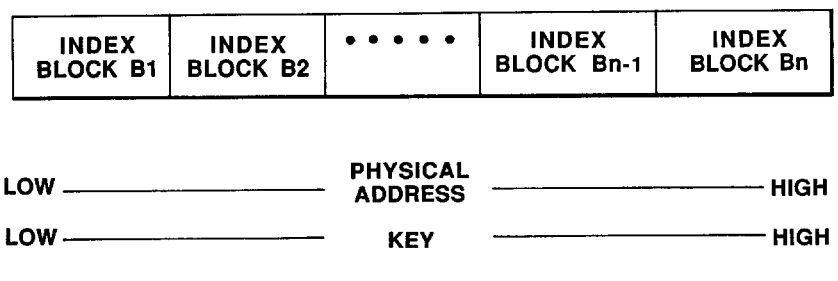
FIG. 8 is a diagrammatic view for illustrating the physical format of the same level index blocks.

Referring to FIG. 8, each group of index blocks is recorded in the order of the increasing physical addresses, that is, from index block Bl to the index block Bn.

As shown in FIG. 9a, the entry key recorded in each block of the first order and higher order indices has a key length of a recorded entry key, an entry key recorded by letter or character data and address data of the next index block associated with the entry key. On the other hand, the entry key recorded in each block of the n'th order index has a key length of a recorded entry key, an entry key recorded by letter or character data, address data of the title data 68 associated with the entry key and address data of the main text data 66 associated with the entry key.

The format of the entry key recorded in the block of the lowermost or n'th order retrieving index, associated with each of the above described retrieving methods, will be explained.

For word retrieval, including both the end word search and the foremost word search, the entry key is constituted, as shown for example in FIG. 10, by an ID code (00H), a key length of an entry key, an entry key of the letter or character data, address data of the main text data 66 associated with the entry key and address data of the title data 68 associated with the entry key.

For condition retrieval, the basic entry is constituted, as shown for example in FIG. 11a, by an ID code (00H), a key length of an entry key, an entry key of the letter or character data, address data of the main text data 66 associated with the entry key and address data of the title data 68 associated with the entry key.

The group entry key is constituted, as shown for example in FIG. 11b, by an ID code (80H), a key length of an entry key or member number, an entry key for letter or character data and address data of the title data 68 associated with the entry key.

The member item is constituted, as shown for example in FIG. 11c, by an ID code (C0H) and address data of the main text data 66 associated with the member item.

For menu retrieval menu data is constituted, as shown for example in FIG. 12, by an ID code (1F43), letter or character data of the menu data, an ID code (1F63) and address data of the main text data 66 associated with the menu data.

Figure 13:
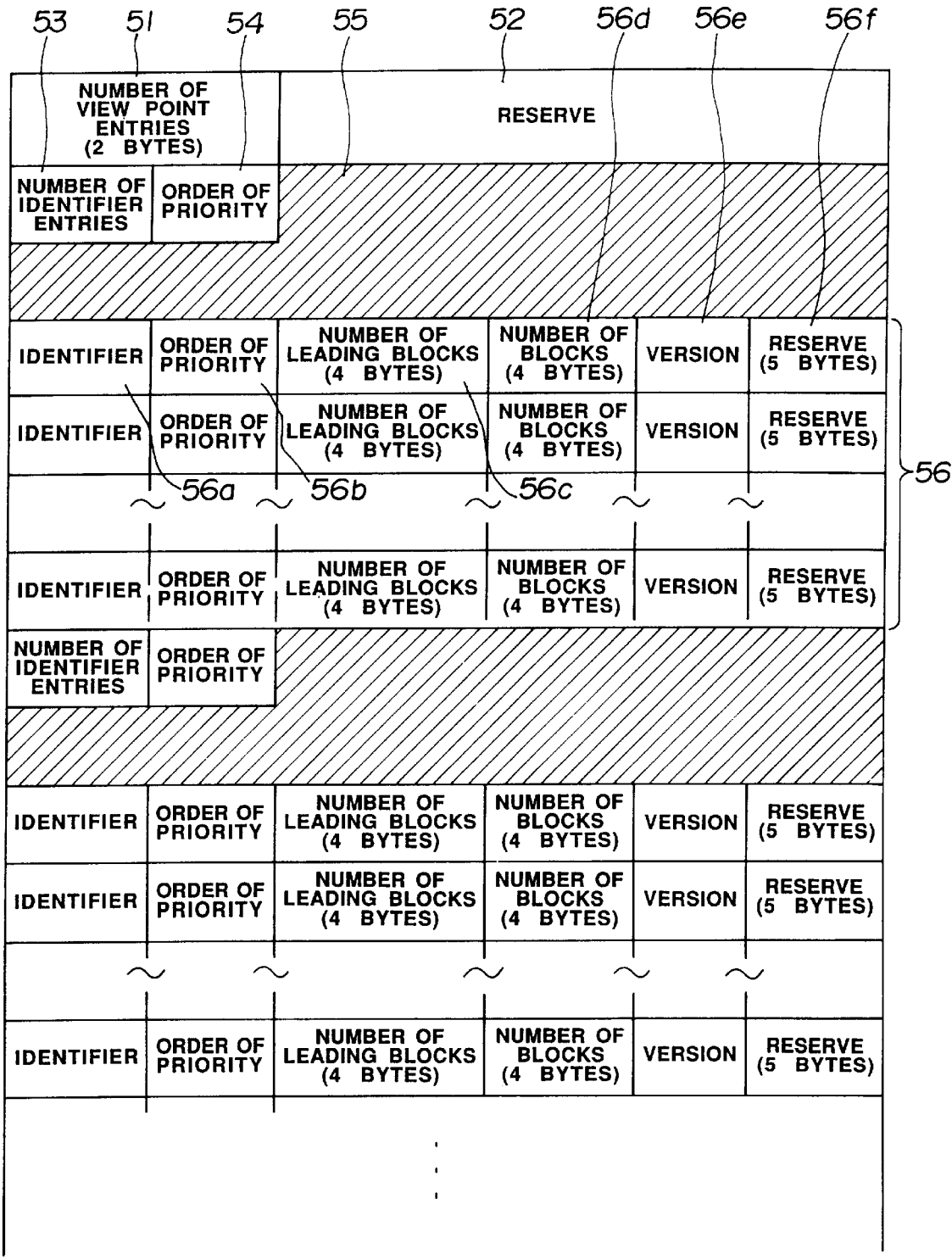
FIG. 13 is a diagrammatic view showing the structure of a viewing point supervising block.

For composite retrieval, a viewing point supervising block shown in FIG. 13 is provided. The viewing point supervising block sets conditions for each search item for a literature having plural retrieving methods to enable retrieving for a sole retrieving item, or composite retrieving, that is a method of taking a logical AND of the various retrieving methods.

The viewing point supervising block consists of a viewing point entry number 51 of, for example, 2 bytes, indicating the number, four in the present embodiment, of the viewing points recorded in the viewing point supervising block, expressed in a binary system, a 14-byte reserve 52, an identifier entry number 53 indicating the number of the indices associated with the retrieving methods, represented by the succeeding retrieval items, a 1-byte preference 54 indicating the preference ranking of the retrieval items, a 30-byte retrieval item name 55, and a literature supervising block 56 in which a leading address associated with the retrieval item name 55 is recorded.

The literature supervising block 56 consists of an identifier 56a indicating the contents of a block indicated by the above mentioned entry, a 1-byte preference 56b permanently stored in an index memory indicated by the entry for indicating the preference level, a leading block number 56c indicating the relative block number (binary value) with a leading block of the index represented by the entry or a literature supervising block of the file set to 1, a block number 56d indicating, by a binary value, that the contents are recorded in several consecutive blocks from the block indicated by the leading block number, the number of editions 56e showing the number of editions of the recording form of the contents shown by the entry, and a reserve 56f.

The indentifier 56a is recorded with identification by a 1-byte ID code. The above mentioned ID codes for the literature supervising block and the viewing point supervising block are sued in common.

In the index, there are recorded leading end search, the end word search and the item-by-item retrieval, which are among the retrieving methods as later described, according to the different ID codes.

The heading data are used for making retrieval from a word or phrase (key word) designated by the user. As these heading data, the forward word heading, with the coincidence of the foremost part of the key word, the end word heading, with the coincidence of the rear part of the key word, and the item-by-item condition heading, are recorded according to the different ID codes.

The key words for retrieval are limited in a majority of cases and, unless the user is aware of the key words, retrieving errors are produced. For eliminating these retrieving errors, a reference table with a list of key words is displayed. The above mentioned input candidate table is this reference table.

The input candidate table has a tree structure, similarly to a list of items which is used when retrieval is performed in accordance with a menu form such as an index or table of contents. As shown in FIG. 14a, the table is made up of a menu identifier 71 indicating the start of a display with an ID code number of, for example, 1F43H, a string of letters or characters 72, which is a series of menu data, a menu terminator 73 indicating the designation of termination with an ID number of, for example, 1F63H, and address data 74 consisting of, for example, a 4-byte block number and a 2-byte offset value. As shown in FIG. 14b, the series of menu data are delimited by the menu identifier 71 indicating the start of a display and the menu terminator 73 indicating the designation of termination, and are recorded as internal data. When read out and displayed on display means, these menu data are displayed as, for example, Japanese dishes, European dishes, Chinese dishes, tea or coffee, luncheon, wine or liquor, and so forth, as shown in FIG. 14c. Meanwhile the data disc in the present example is a guide to restaurants, and the string of letters or characters stored in the table consist only of the so-called Japanese Industrial Standard (JIS) code or special symbol or letter code to the exclusion of various control codes. It is because the string of letters or characters directly proves to be the key word.

Figure 15D:

FIGS. 15(a)–15(d) show the format of the lowermost layer of the retrieving index associated with the composite retrieving method (form and pronunciation). As shown in FIG. 15a, the format is made up of a basic entry and a group entry including a key item and a plurality of member items.

FIG. 15b shows the format of the basic entry which is made up of an ID code with a code number of OOH, a key length, an entry key, a main text address and a title address. FIGS. 15c and 15d show the formats of the group entry, the key item of which is made up of an ID code having a code number of 80H, a key length, the number of members and an entry key, as shown in FIG. 15c, and the member item of which is made up of an ID code having a code number of, for example, COH, a main text address and a title address, as shown in FIG. 15d.

With the above described file construction, after the application software piece reads the literature supervising block, the positions of the various indices and main text data may be acquired from the data of the literature supervising blocks. In this case, an address information of various data of the application software are supervised by the relative block numbers, with the literature supervising block as the starting point.

Figure 16:
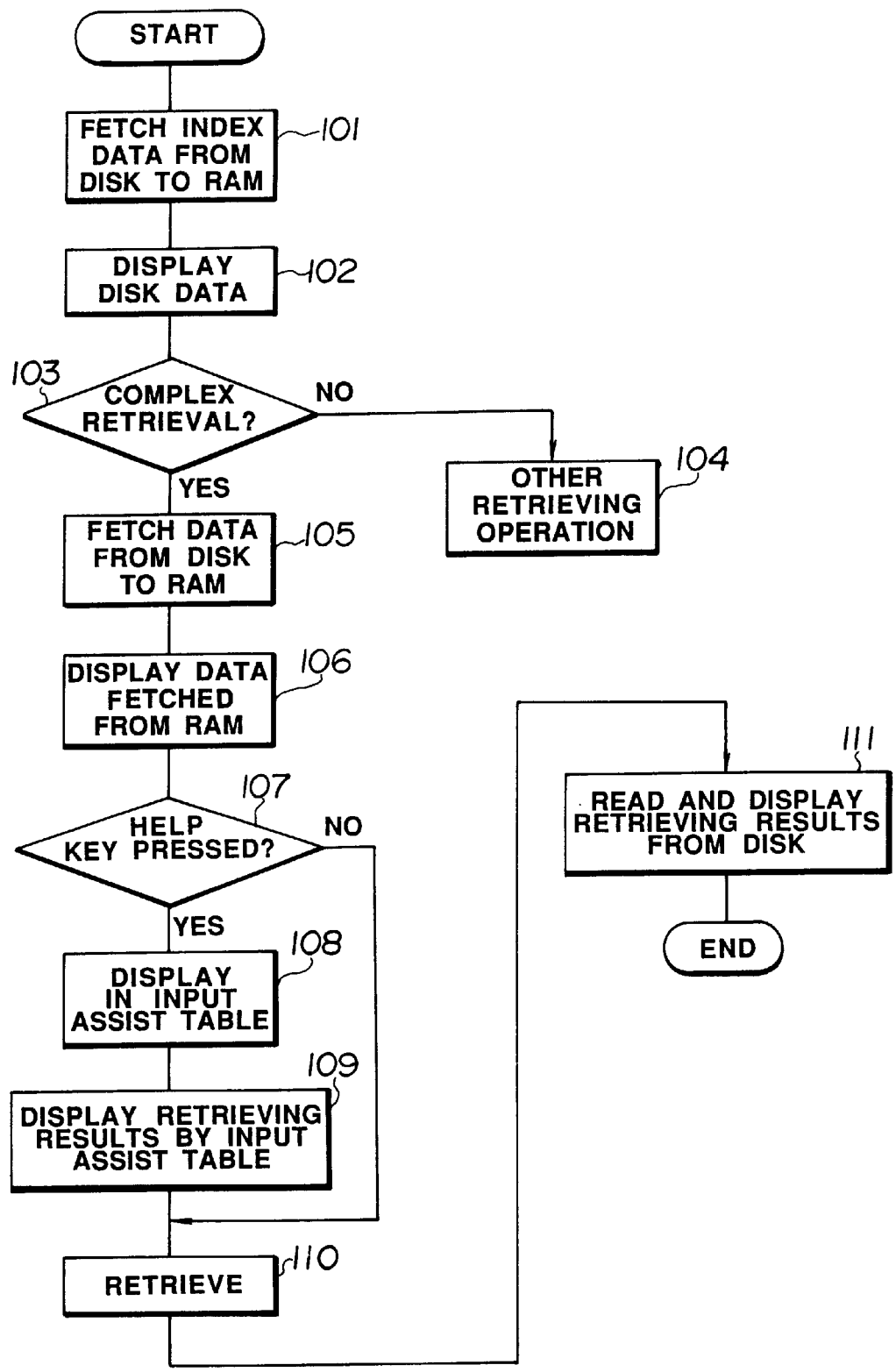
FIG. 16 is a flow chart for illustrating the data retrieving method according to the present invention.
Figure 17:
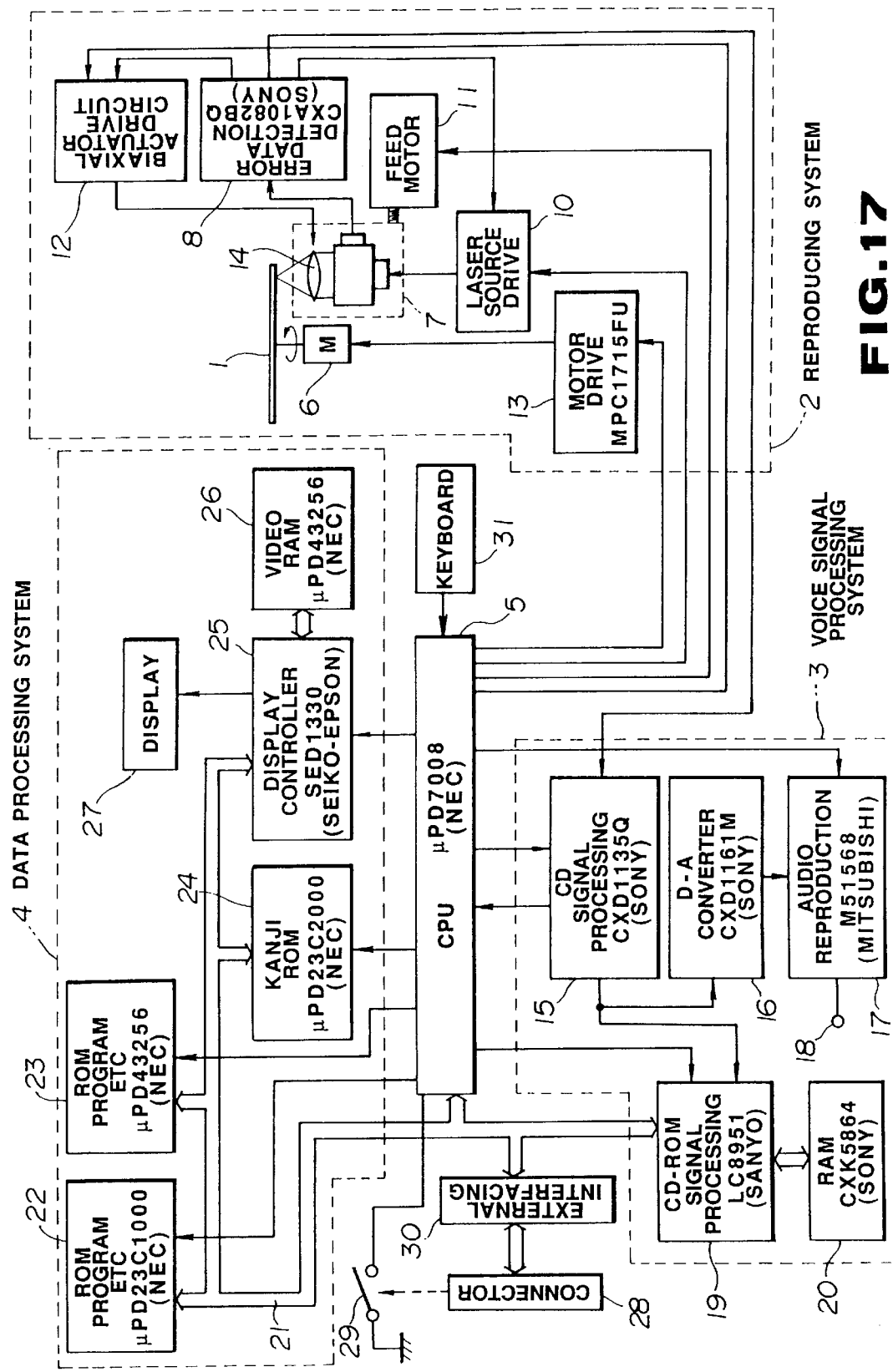
FIG. 17 is a block diagram of a data reproducing apparatus according to the present embodiment.

Referring now to FIGS. 16 and 17, the steps followed by the CPU 5 of the apparatus (as will be described in further detail in reference to FIG. 17) in retrieving a given key word is explained by a flowchart shown in FIG. 16.

Prior to retrieving, the above mentioned index data corresponding to, for example, TOC data of a CD, for example, are read out at step 101 from a loaded data disc 1 and fetched to, for example, a RAM (random access memory), the program then proceeds to step 102.

At step 102, the name of the search item for each retrieving method associated with the fetched index data is displayed on a display means 27 before the program proceeds to step 103.

The user selects a desired one of these displayed search items by means of a keyboard 31. At step 103, it is determined if the selected retrieving method is the composite retrieving method. If the result of decision is NO, the program proceeds to step 104 to perform the processing by the selected retrieving method. If the result of decision is YES, the program proceeds to step 105 where the data of composite retrieving are read out from a data disc 1 and fetched to RAM, before the program proceeds to step 106.

At step 106, the data fetched from the data disc 1 at step 105 are displayed on the display means 27. The program then proceeds to step 107.

At step 107, it is determined if a help key used when the key word is not known to the user has been pressed. If the results of decision is NO, the program proceeds to step 110 to perform a retrieving operation and, if the result of decision is YES, the program proceeds to step 108.

At step 108, the input candidate table as shown in FIG. 15 is displayed on display means 27 before the program proceeds to step 109.

For example, when the loaded data disc 1 is a guide to eating establishments, the user enters the shop name, the type of the food or drink and the desired site of the establishment by a key word in accordance with the displayed input candidate table. At this time, should there exist a plurality of relevant items for the key word entered in accordance with the input candidate table, these relevant items are displayed at step 109 on display means 27. The program then proceeds to step 110.

The user selects a desired one of the displayed relevant items. At step 110, the search operation is performed on the selected item. The program then proceeds to step 111.

At step 111, the results of retrieval of step 110 are read out from the data disc and displayed on the display means 27 to terminate the operation.

In prior art devices of this type, the search items, such as the shop name, are recorded on a retrieving software, such as a floppy disc, so that it has been necessary to provide a retrieving software piece for each application software piece. However, by providing a view point supervising block on the data disc, it becomes possible to acquire address data of the retrieving indices and retrieving items with the use of a single type of the retrieving software.

The data recorded on the above mentioned data disc may be reproduced by a reproducing apparatus shown for example in FIG. 17.

As shown in FIG. 17 the signal processing system of the reproducing apparatus for a disc is made up of a reproducing system 2 for reproducing data recorded on optical disc 1, a audio signal processing system 3 mainly for processing the read-out data, and a data processing system 4 for retrieving the readout data for performing image display. These systems are controlled by a sole CPU (central processing unit) 5 which will be elucidated subsequently. As the CPU 5, the CPU manufactured by NEC under the trade name of μPDPD 7008 is employed.

In the above described reproducing system 2, the CPU 5 is responsive to an input from a keyboard 31 to control a laser light source driving circuit 10, a thread feed motor (linear feed motor) 11, a biaxial actuator driving circuit 12 and a motor driving circuit 13. As the motor driving circuit 13, a device manufactured by Motorola Inc, under the trade name of MPC 1715 FU is employed. Thus the CPU 5 controls the motor driving circuit 13 for rotationally driving the spindle motor 6 at, for example, a constant linear velocity (CLV) or at a constant angular velocity (CAV). Simultaneously, the CPU controls the optical pickup 7 made up of the object lens 14 constituting the biaxial device, the light source, the photodetector and the cylindrical lens by thread feed motor 11 to shift the pickup 7 roughly to a desired track on the data disc 1. The biaxial actuator driving circuit 12 is also controlled to shift the object lens 14 of the optical pickup 7 along the optical axis of the object lens by way of performing a focusing control, or to shift the object lens 14 in a direction normal to the optical axis of the object lens to irradiate a desired recording track of the optical disc 1 by way of performing a tracking control for reproducing data recorded on the data disc 1.

On the signal recording region of the data disc 1, there are provided a subcode area and a data area for each frame and, in the subcode area, there are recorded sync signals, position data and timing data. Data such as letter or character data are written in the data area. The data signals thus read out from the data disc 1 are supplied to error detection-data detection circuit 8 where the sum or the difference is taken to detect the laser output error signal, focusing error signal and the tracking error signal. As the error detection-data detection circuit 8, a device manufactured by Sony Corporation under the trade name of CXA 1082 BQ is preferably employed. The laser output error signal is supplied to the laser light source driving circuit 10, while the focusing error signal and the tracking error signal are supplied to the biaxial actuator driving circuit 12. The laser light source driving circuit 10 controls the power of the laser light irradiated on the disc surface to be a constant value by the laser output error signal supplied thereto, whereas the biaxial actuator driving circuit 12 drives the object lens 14 in dependence upon the focusing error signal and the tracking error signal to maintain focusing and tracking in the normal condition to enable data to be read out accurately.

The reproduced signal from the data disc 1, including detected sync signals or timing data, are supplied to a CD signal processing circuit 15 of the signal processing system 3 by way of the error detection-data detection circuit 8. As the CD signal processing circuit 15, a device manufactured by Sony Corporation under the trade name of CXD 1135 Q is preferably employed. The detection signal indicating the result of detection of whether the loaded optical disc is a so called optical disc for music on which musical data are recorded or a so-called CD-ROM on which letter or character data, such as a dictionary or an encyclopedia data, are recorded, is supplied from CPU 5 to the CD signal processing circuit 15. The circuit 15 separates the reproduced signal supplied thereto into sub-data signals such as sync or timing data and main data signal and, if the main data signals are audio data, transmits the audio data signals to digital/analog (D/A) converter 16. As the converter, a device manufactured by Sony Corporation under the trade name of CXD 1161 M is preferably employed. The audio data signals, supplied to the D/A converter 16, are converted into analog signals, which are transmitted to an audio reproducing circuit 17 so as to be outputted as audio signals at output terminal 18. As the audio reproducing circuit 17, a device manufactured by Mitsubishi Electric Co. Ltd. under the trade name of M 51568 is preferably employed. If the data signals supplied to the CD signal processing circuit 15 are the above mentioned character data signals, the CD signal processing circuit 15 transmits the character data signals to a CD-ROM signal processing circuit 19. As the CD-ROM processing circuit 19, a device manufactured by Sanyo Electric Co., Ltd. under the trade name of LC 8951 is preferably employed. The character data signals supplied to the CD-ROM signal processing circuit 19 are read out in dependence upon signals supplied from CPU 5 by way of RAM 20 functioning as the memory for transient storage. As the RAM 20, a device manufactured by Sony Corporation under the trade name of CXK 5864 is preferably employed. A ROM 22 and a RAM 23 in which the program or the like are stored are connected to data bus 21. As the ROM 22 and RAM, the device manufactured by NEC under the trade names of $\mu$PD 23 C 100 and $\mu$PD 43256, respectively, are preferably employed. The character data signals thus read out are transmitted over data bus 21. A display image is recorded and formed in a video RAM 26 by a Kanji pattern or the like read out from Kanji ROMO 24 in accordance with the above mentioned character data signals. The display image in video RAM 26 is read out by a display controller 25 in accordance with signals from CPU 5 so as to be displayed on a display section 27 such as a liquid crystal device (LCD). As the Kanji ROM 24, display controller 25 and the video RAM 26, the device manufactured by NEC, Seiko Epson Company and NEC under the trade name of 0PD 23C 2000, SED 1370 and $\mu$PD 43256, respectively, are preferably employed.

Meanwhile, should an external interface be connected to connector 28, switch 29 is turned on simultaneously to reset the CPU 9 to perform signal processing under the command from the interface. The instructions from the interface are processed by external interface processing circuit 30 and the processed data are displayed on the display section 27 by means of data bus 21, as described previously.

Since the portions of the above described reproducing apparatus for a disc which are used as a man-machine interface for data processing and display are not in need of strict timing processing and hence may be processed as main routine, while the remaining operation may be performed by an interrupt routine, the overall signal processing is taken charge of by the sole CPU 5. Also, considering that software control is performed between the driving CPU of the present apparatus and the host CPU of an commercially available microcomputer system provided outside the present system, the code system between the command packet and the status is utilized in the bus line system interconnecting these CPU 5. When the present is desired to be controlled from an external host, the main routine on the drive CPU side of the present system is replaced by HALT instructions so that the present system may be used by the host CPU only by starting the bus line control routine.

With the reproducing apparatus for a disc 40 fitted with the above described signal processing system providing the disc with function of an electronic dictionary, the data processing system 4 excluding the reproducing system 2, CPU 5, audio signal processing system 3 and the display section 27, which may be constructed for example by LCD, is enclosed within the main body of the apparatus 44, within which is loaded a disc cartridge containing a CD-ROM on which are recorded data such as a dictionary or an encyclopedia. On a surface of the main body of the apparatus 44 which faces the outside when the main body is closed, there is rotatably mounted, by means of a supporting shaft, a key operating section 45 on which are arrayed. an alphabet key 41, a cursor shift key 42 and a selection key 43 for selecting a selection item to which the cursor has been shifted, as shown in FIGS. 12 and 13. On the back surface of the key operating section 45 opposite to the surface thereof on which the keys are arrayed, there is mounted a cartridge holder 46 into or out of which a disc cartridge containing a CD-ROM may be inserted or removed. This cartridge holder 46 is supported by the main body of the apparatus 44 so as to be rotated to follow the rotation of the key operating section 45. A cover member 47 for covering the key operating section 45 to cover the upper surface of the main body of the apparatus 44 is rotatably mounted on the main body of the apparatus 44 by means of a pivot shaft 48. On the inner surface of the cover faces the key operating section 45 when the cover is applied as shown in FIG. 12, there is provided a display section 27 for displaying data such as character data read out from CD-ROM.

Meanwhile, the cover member 47 provided with the display section 27 is supported, during use of the apparatus, by the main body of the apparatus 44, so that it may be turned to and maintained at a desired rotational position laying the surface of the key operating section 45 open to permit easy viewing of the display screen of the display section 27, as shown in FIG. 13. During non-use of the reproducing apparatus 40, the cover member 47 is closed upon the key operating section 45 to a small rectangular size to permit easy handling.

The operation of the above described disc reproducing apparatus is hereinafter explained.

It is assumed that the English-Japanese dictionary and the Japanese-English dictionary are recorded in the data disc.

Figure 20:
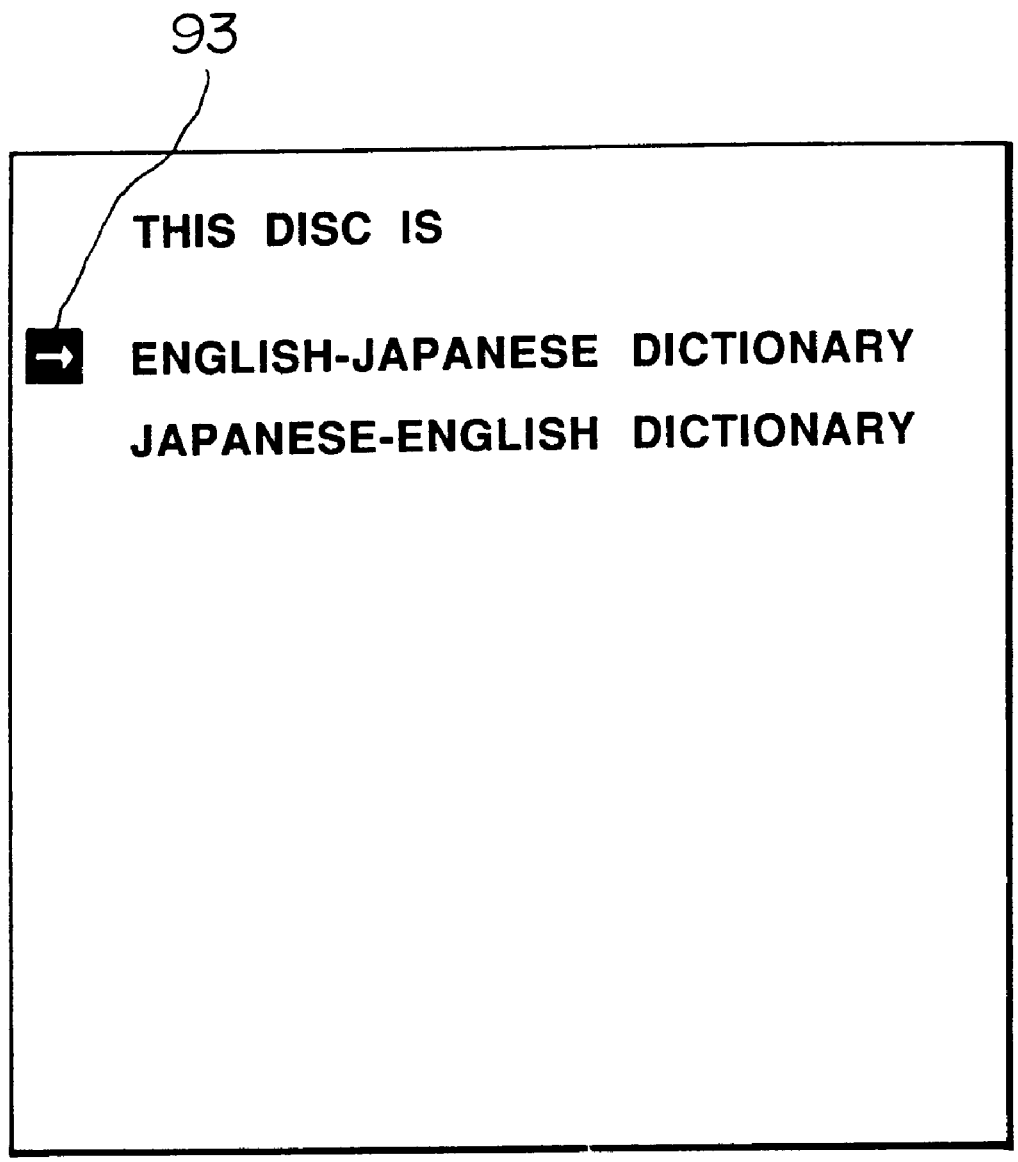
FIG. 20 is a diagrammatic view showing an initial picture on the display of the apparatus depicted in FIGS. 18 and 19 during data disc reproduction.

When the data disc is set in the disc reproducing apparatus, the disc reproducing apparatus reproduces the volume descriptor 211 to grasp the logical construction of the data disc and the position of the route directory to reproduce the route directory 212. In this manner, as shown for example in FIG. 20, an indication "This Disc is an English-Japanese Dictionary and a Japanese-English Dictionary" is displayed on a display screen of the disc reproducing apparatus.

The user operates an icon or mouse 93 to select a desired one of the displayed literatures.

Figures 21A, 21B:
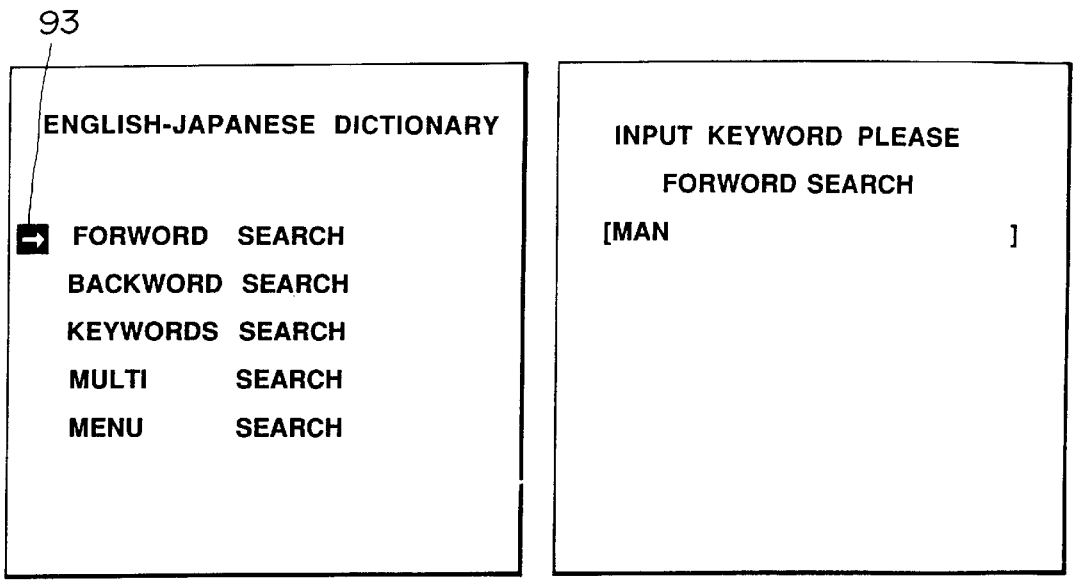
FIGS. 21(a)–21(d) are diagrammatic views showing an example of a display sequence for a word search (foremost word search).

If the English-Japanese dictionary is selected, the disc reproducing apparatus reproduces the literature supervising block 75 of the English-Japanese dictionary and displays the methods for word search (foremost word search), word search (end word search), condition retrieval and menu retrieval, as shown for example in FIG. 21a.

The user operates the icon 93 to select the desired retrieving method depending on the word to be retrieved.

If for example, a word beginning with "MAN" is to be retrieved, the user selects the word retrieval (foremost word search) from the retrieving methods.

The disc reproducing apparatus reproduces the identifier or discriminator 83 of the literature supervising block in which the address of the index for word search (foremost word search) is recorded to make preparations for reproduction of the index for word search (foremost word search), while indicating a display "Input Keyboard Please" on the display screen as shown in FIG. 21b. When the user accordingly enters "MAN", data retrieval is performed by a tree structure, so that words beginning with "MAN" are read out from the title data 68 and displayed on the display screen, as shown for example in FIG. 21c.

Figures 21C, 21D:
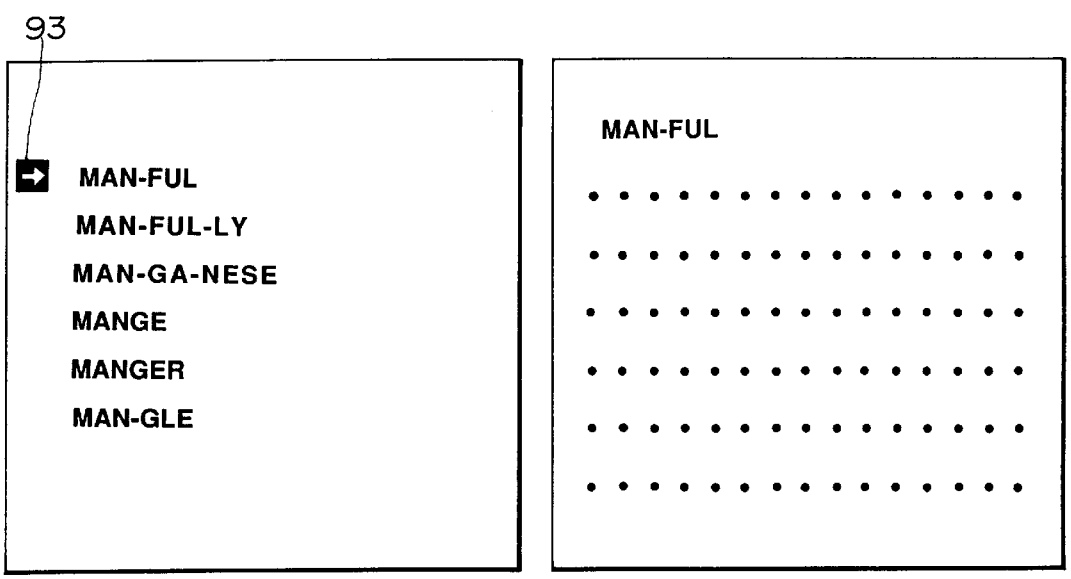

The user then selects "man-ful" from the displayed words by a cursor 93. In this manner, the meaning of the selected word "man-ful" is displayed, as shown in FIG. 21d.

When the user desires to retrieve a word terminating with "MAN", the user operates the icon 93, as shown in FIG. 22a, to select the word search (end word search) from the retrieving methods.

Thus the disc reproducing apparatus reproduces the discriminator 83 of the literature supervising block where the address of the index for end word search is recorded to make preparations for the reproduction of the index for end word search, while displaying "Enter retrieve-word" on the display screen, as shown for example in FIG. 22b.

When the user accordingly enters "MAN", data retrieval is performed by a tree structure, so that words terminating with "MAN" and read out from the title data 68 and displayed on the display screen, as shown for example in FIG. 22c.

The user then selects "space-man", for example, from the displayed words by cursor 93. In this manner, the meaning of the selected word "space-man" is displayed, as shown for example in FIG. 22d.

An example of the composite retrieving method is hereinafter explained.

Figure 23D:
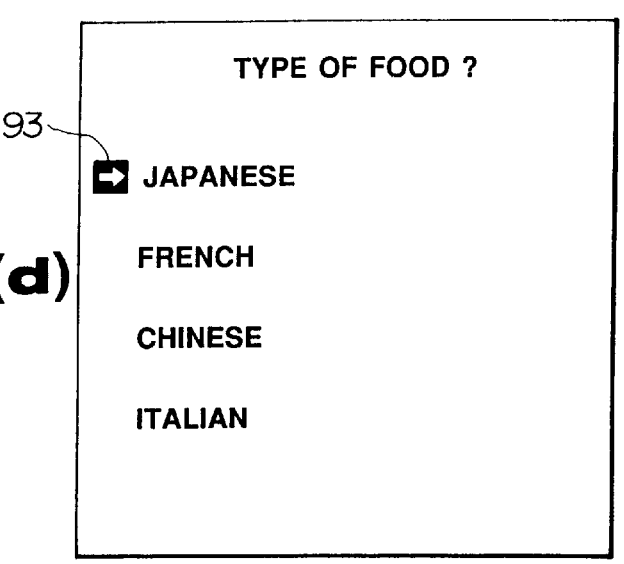

If the data disc is a "guide to restaurants", for example, the disc reproducing apparatus reproduces the literature supervising block 75 of the file of the "guide to restaurants" and displays the retrieving methods applied to composite retrieving, that is, word search, (foremost word search) and word search (end word search), as shown for example in FIG. 23a.

When the user desires to select one of plural stores which is best suited to the desired conditions, he or she operates an icon 93 to select "composite retrieving", as shown in FIG. 23b.

When the "composite selection" is selected, an input candidate table is displayed on the display screen for displaying the phrases "what is the restaurant name?", "What is type of food?", "Where is the restaurant located?" or "what is the price range?" to permit the user to enter the desired conditions, as shown for example in FIG. 23c.

The user enters the name of the restaurant if it is known. However, the name of the restaurant need not be entered if otherwise.

Figure 23E:
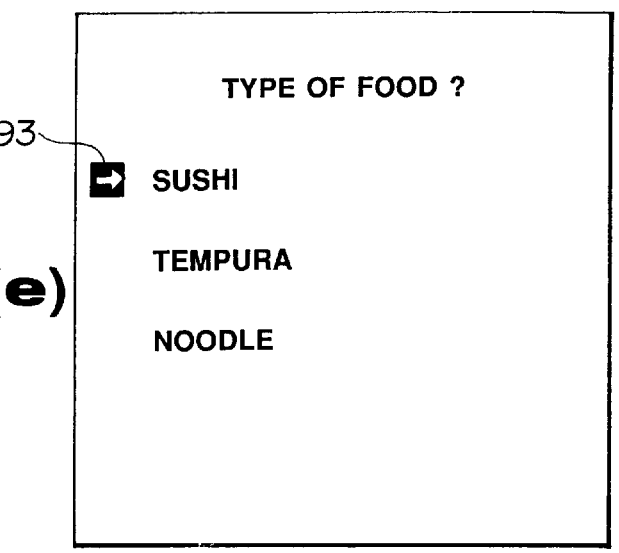

The type of food is then entered. At this time, input samples such as Japanese dishes, French dishes, Chinese dishes or Italian dishes, are displayed, as shown for example in FIG. 23d. The user operates the cursor 93 to select a desired type of food. When the Japanese dishes are selected, input samples such as sushi, tempura or noodles, are displayed on the display screen, as shown in FIG. 23e. The user then selects the desired food type, such as sushi.

Figure 23F:
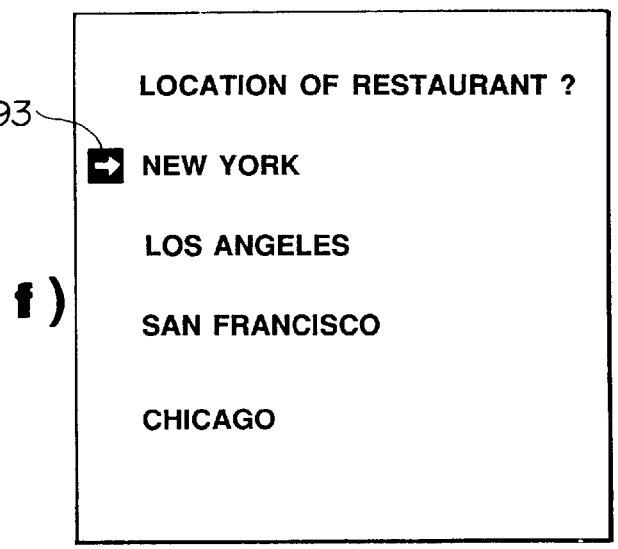

The user than enters the territory. As in the case of specifying the type of food, input samples of the territories, such as New York, Los Angeles, San Francisco or Chicago, are displayed, as shown for example in FIG. 23f.

Figures 23G, 23H, 23I:
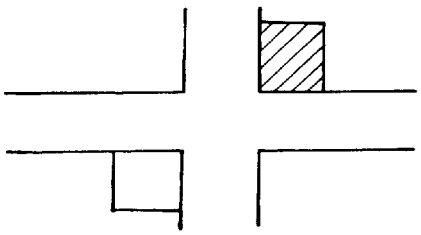

If the user selects New York, input samples such as Manhattan, Long Island or the like are displayed, for further specifying the territory, as shown in FIG. 23g. The user selects Manhattan, for example.

The user then inputs the price per man, such as 3,000 yen. When these items are entered, the names of the restaurant suited to the user's liking, such as Nippon Sushi, Manhattan Sushi or Ichiban-Sushi are retrieved and displayed, as shown in FIG. 23h.

When the user selects a desired one of the displayed-restaurants, the telephone number, charges, seating capacity and a simplified map to the restaurant are displayed, as shown for example in FIG. 23i.

It will be seen from above that the above mentioned view point block, in which are recorded the main text data, index data for retrieving the main text data, names of the retrievable items of the leading addresses of the indices associated with the retrievable items, is provided on the data disc, the names of the retrieving items are read out from the data disc and displayed, the names of the selected retrieving items are retrieved on the basis of the indices and the main text data associated with the retrieving item data are read out and displayed, whereby a sole retrieving software piece may be used for a plurality of software pieces of the data disc to facilitate the learning process. Besides, one needs to purchase a retrieving software piece once and for all. A variety of application software pieces may be realized by using the above mentioned data disc and by introducing composite retrieval which has so far been limited to the dictionary type.

Since there is no necessity of newly designing retrieval systems or software pieces for each software piece of the data disc, the working load on the developer or developing expenses are reduced to realize low costs. In addition, since the retrieving system is limited to letters or characters, retrieving software pieces may be transplanted smoothly.

By unification of the retrieving software, the retrieving software may be formed by IC and contained in hardware to reduce its size. By assuring software interchangeability, it becomes possible to make use of the software piece in conjunction with a wide variety of hardware devices and to enable the soft ware pieces to be sold in large quantities.

What is claimed is:

1. An optical disc recorded with data in a CD-ROM format and International Standards Organization (ISO) format standard 9660, the disc comprising a volume descriptor including a positioning information of a route directory and at least one file name data, a route directory and at least one file, the route directory including at least positioning data of the file and length data of the file, the file having literature supervising data, main text data including at least letter or character data and a plurality of index data for retrieving the main text data and being constituted as a tree structure, the literature supervising data being arranged in a lead position of the file and including address data of the plurality of index data and the main text data.

2. A retrieving method for an optical disc, the disc being recorded with data in a CD-ROM format and International Standards Organization (ISO) format standard 9660, and being comprised of a volume descriptor including a positioning information of a route directory and at least one file name data, a route directory and at least one file, the route directory including at least positioning data of the file and length data of the file, the file having literature supervising data, main text data including at least letter or character data and a plurality of index data for retrieving the main text data and being constituted as a tree structure, the literature supervising data being arranged in a lead position of the file and including address data of the plurality of index data and the main data, the method comprising the steps of:

reading out the volume descriptor and storing the read-out volume descriptor in storing means;

displaying a file name according to the volume descriptor stored in the storing means;

reading out and displaying index data of the selected file using the literature supervising data;

retrieving and displaying the index data of a lower layer according to the selected index data of a higher layer; and retrieving the main data selected by using the displayed index data.

3. A data disc comprising:

a data recording area in which a volume descriptor including at least data for discriminating the data disc, a route directory including each position of each one of a plurality of data files and the data files the positions of which are specified by the route directory, are recorded; and wherein each data file includes main text data including at least leter or character data, various retrieving index data for retrieving the main text data, and literature supervising data for retrieving the retrieving index data and the main text data.

4. The data disc according to claim 3 wherein, for composite retrieval, names of the retrievable items as the index data and recording leading addresses for the index data associated with the names of the retrievable items are recorded.

5. A data retrieving method comprising using a data disc having a data recording area in which a volume descriptor including at least data for discriminating the data disc, a route directory including each position of each one of a plurality of data files, the data files each including main text data including at least letter or character data, various retrieving index data for retrieving the main text data and literature supervising data for retrieving the retrieving index data and the main text data, comprising the steps of:

displaying the data file names in the route directory, selecting one of the displayed data files, reading the selected literature supervising data, displaying various retrieving methods on the basis of the selected literature supervising data, and performing retrieval on the basis of index data associated with a selected one of the displayed retrieving methods.

6. The data retrieving method according to claim 5 comprising the further steps of:

using a data disc wherein names of the retrievable items as the index data and recording leading addresses for the index data associated with the names of the retrievable items are recorded, displaying the retrievable items when composite retrieval is selected from among a plurality of displayed retrieving methods, entering retrieving data items associated with the displayed retrieving items, retrieving the entered retrievable item data on the basis of the index data and reading out the main text data associated with the retrievable item data for display.

* * * * *

UNITED STATES PATENT AND TRADEMARK OFFICE
CERTIFICATE OF CORRECTION

PATENT NO.: 5,920,541
DATED: July 6, 1999
INVENTOR(S): NORIMASA SASAKI ET AL.

It is certified that an error appears in the above-identified patent and that said Letters Patent is hereby corrected as shown below:

In Col. 16, line 9, "leter" should be --letter--

Signed and Sealed this

Seventh Day of December, 1999

Attest:

Q. TODD DICKINSON

Attesting Officer

Acting Commissioner of Patents and Trademarks